United States Patent
Pinard et al.

(10) Patent No.: US 6,647,103 B2
(45) Date of Patent: Nov. 11, 2003

(54) PALM PC DOCKABLE PHONE

(75) Inventors: Debbie Pinard, Kanata (CA); Ed Bijman, Stittsville (CA); Douglas C. Oddy, Greely (CA)

(73) Assignee: Mitel Corporation, Ontario (CA)

( * ) Notice: Subject to any disclaimer, the term of this patent is extended or adjusted under 35 U.S.C. 154(b) by 0 days.

(21) Appl. No.: 09/502,085

(22) Filed: Feb. 10, 2000

(65) Prior Publication Data

US 2003/0123627 A1 Jul. 3, 2003

(30) Foreign Application Priority Data

Feb. 11, 1999 (GB) .............................................. 9903042

(51) Int. Cl.⁷ ............................................. H04M 11/00
(52) U.S. Cl. ................................................. 379/110.01
(58) Field of Search ........................ 379/110.01, 90.01, 379/93.01, 93.09, 93.17, 93.23, 93.05; 455/556, 557

(56) References Cited

U.S. PATENT DOCUMENTS 5,835,732 A * 11/1998 Kikinis et al. .............. 395/281
6,128,372 A * 10/2000 Tsai et al. .............. 379/110.01
6,266,539 B1 * 7/2001 Pardo ....................... 379/93.05
6,344,727 B1 * 2/2002 Desai et al. ................. 320/107

FOREIGN PATENT DOCUMENTS

| GB | 2318703 A | 4/1998 |
| GB | 2318703 | 4/1998 |
| GB | 2328344 A | 2/1999 |

* cited by examiner

Primary Examiner—Stella Woo
(74) Attorney, Agent, or Firm—F. Chau & Associates, LLP

(57) ABSTRACT

A palm PC dockable phone, comprising a personal computer running a software application for implementing telephony functions, a personal digital assistant (PDA) device providing a user display and input interface, and a telephone set connected to the personal computer and in communication with the PDA device, wherein the telephone set incorporates phone firmware for communicating with the software application and PDA firmware for communicating with the PDA device for controlling the telephony functions via the user display and input interface.

7 Claims, 4 Drawing Sheets

PALM PC DOCKABLE PHONE

FIELD OF THE INVENTION

This invention relates in general to Computer Telephony Integration (CTI), and more particularly to a system for integrating functionality of a PDA (Personal Digital Assistant) with a combined telephone set/docking station connected to a personal computer (PC).

BACKGROUND OF THE INVENTION

Palm-top or hand-held PDA's such as the Palm Pilot® PC or the Casio® E-10 PDA provide a mobile user with "pocket" applications which are controlled using a pen-based input device, buttons and an LCD output. These devices are enjoying increased popularity because of their lightweight construction and compact design (e.g. the devices can fit easily in a jacket pocket or purse and provide the user with useful features such as contact data bases, address books, schedulers, notepads, etc.). Palm-top PCs and PDA's are normally designed to operate as stand-alone units, independently of any workstation PC. However, workstation cradles are normally provided for synchronizing the palm-top PC with a workstation PC. Thus, a user's address books and schedulers in both the palm-top device and the user's desktop computer can be synchronized with each other when changes are made in either device. The cradle consists of a plastic molded housing for receiving the palm-top PDA. The housing contains an integrated power supply and a serial connection to the workstation. Thus, when "docked" in the cradle, the palm-top PDA battery may be charged and the applications running on both the palm-top PDA and workstation may be synchronized over the bi-directional serial link.

Quite independently of the palm-top PDAs discussed above, CTI systems are known for integrating telephony features with a PC. For example, the Mitel Personal Assistant® integrated telephony system includes a telephone which is connected to a workstation PC via a serial bus or USB, and software for integrating applications running on the desktop PC with telephony features offered by the attached telephone. Thus, for example, the CTI software can be configured so that when an incoming call is received with CLID (Calling Line Identification), a contacts database is accessed and information about the calling party is displayed while the telephone rings. Or, soft keys can be programmed on the telephone, via the computer, to launch an application on the computer, such as a spreadsheet.

SUMMARY OF THE INVENTION

According to such prior art palm-top PDAs and CTI systems, the telephone set and palm-top PDA are treated by the desktop workstation as separate devices. According to the present invention, a system is provided for integrating the functionality of the telephone and palm-top PDA when connected to a desktop workstation (either physically or via remote connection such as infrared). Thus, users are able to perform communication functions at the desktop, using the familiar palm-top interface.

In one embodiment, the palm-top PDA is dockable within a base telephone set, so that the telephone set performs the function of the cradle in existing devices. However, according to the present invention software is provided in both the telephone and palm-top PDA which allows the palm-top device to control communication functions of the telephone, such as dialing a number from the palm-top address book, displaying information on an incoming caller using CLID data, etc. Also, where the telephone set is not provided with a display, the palm-top PDA, when docked in the telephone set, functions as a display to show numbers dialed, set features, etc.

Recent palm-top PDAs include an infrared port that allows two palm-top PDAs to communicate with each other. According to another embodiment of the invention, the telephone is provided with such an infrared port instead of (or in addition to) physically cradling the palm-top PDA. Thus, as an example, if a user who is equipped with a system according to this embodiment receives a telephone inquiry from a first party which requires the user to consult a second party before replying, the user can simply access the data entry for the second party in the user's palm-top PDA and invoke a phone display application in the palm-top PDA which causes the palm-top PDA to synchronize with the telephone set via the infrared port, and transmit the appropriate dialing information to the telephone. The telephone then establishes a hands-free call connection with the second party (while the first party is on soft hold) so that the user can consult the second party. The user can then swap calls to the first party, via the palm-top PDA for completing the call.

BRIEF DESCRIPTION OF THE DRAWINGS

A detailed description of the preferred embodiment of the present invention is described herein below, with reference to the drawings in which.

DETAILED DESCRIPTION OF THE PREFERRED EMBODIMENT

Figure 1:
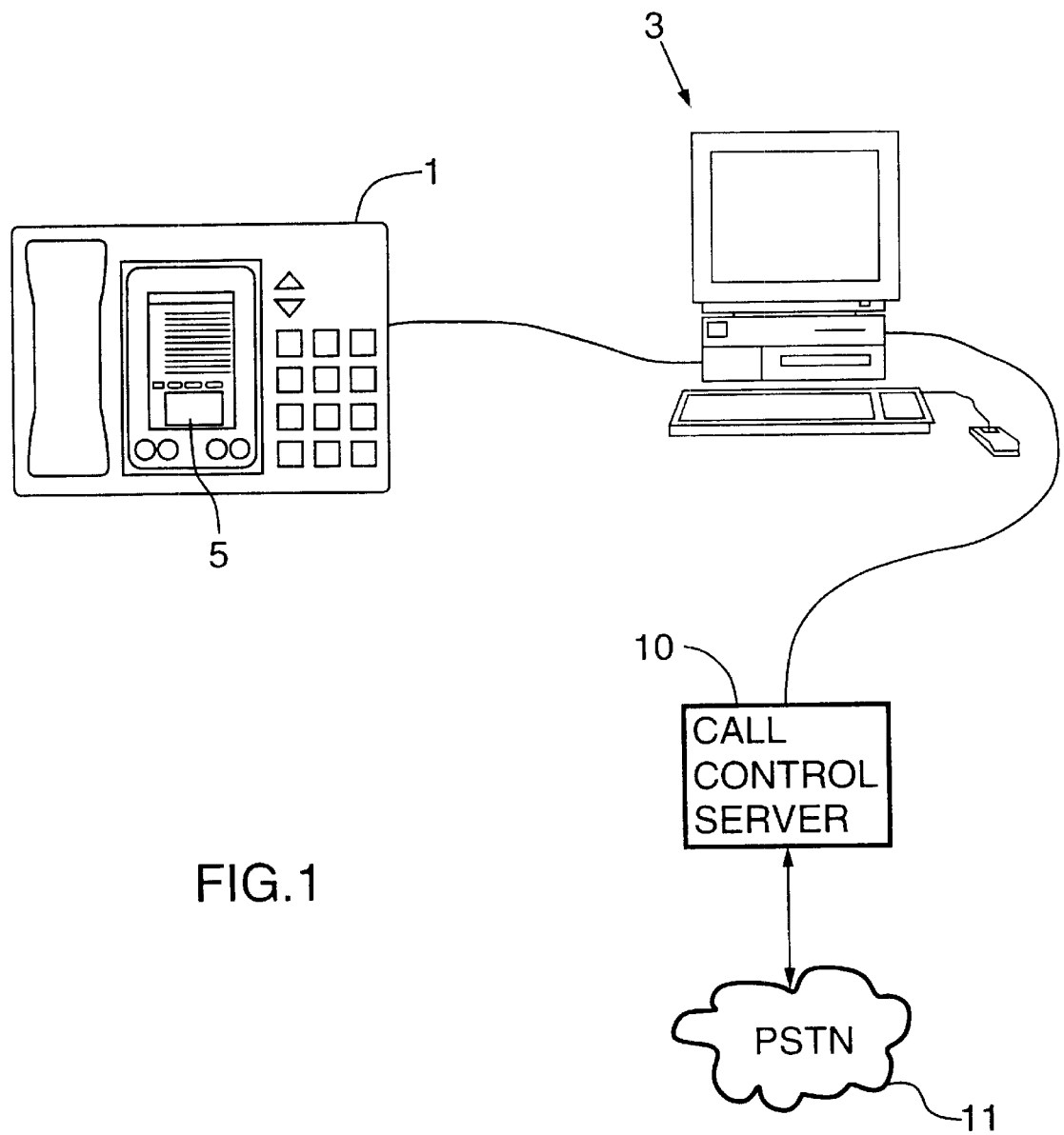
FIG. 1 shows a palm-top PDA docked into a telephone set which, in turn is connected to a desktop workstation, according to a first embodiment of the invention.

Turning to FIG. 1, a telephone set 1 is shown according to a first embodiment of the invention, connected to a desktop workstation 3. This connection can be via a serial bus (e.g. RS-232), USB or any other suitable bi-directional communication link. The workstation 3 executes a CTI software application for implementing advanced computing and telephony features over the PSTN 11 (public switched telephone network) via a call control server 10 or on a stand-alone basis. Examples of the former are ubiquitous in the CTI art, and one example of the latter configuration is the Mitel Personal Assistant® integrated telephony system discussed herein above.

A palm-top PC 5 is shown docked within a cradle disposed in a central portion of the telephone set 1. The set 1 provides power for operating the palm-top PC 5 while recharging its battery. As discussed in greater detail below with reference to FIG. 4, software applications running on the telephone set 1 and palm-top PC 3 allow the devices to communicate with each other. A phone display application (FIG. 4) on palm-top PC 5 permits the palm-top PC to place telephone calls and perform other call control functions. For incoming calls to the telephone set 1, palm-top PC 5 can be configured via the phone application to display information on the incoming caller, automatically open predetermined applications on the palm-top PC depending on who is calling, etc.

Figure 2:
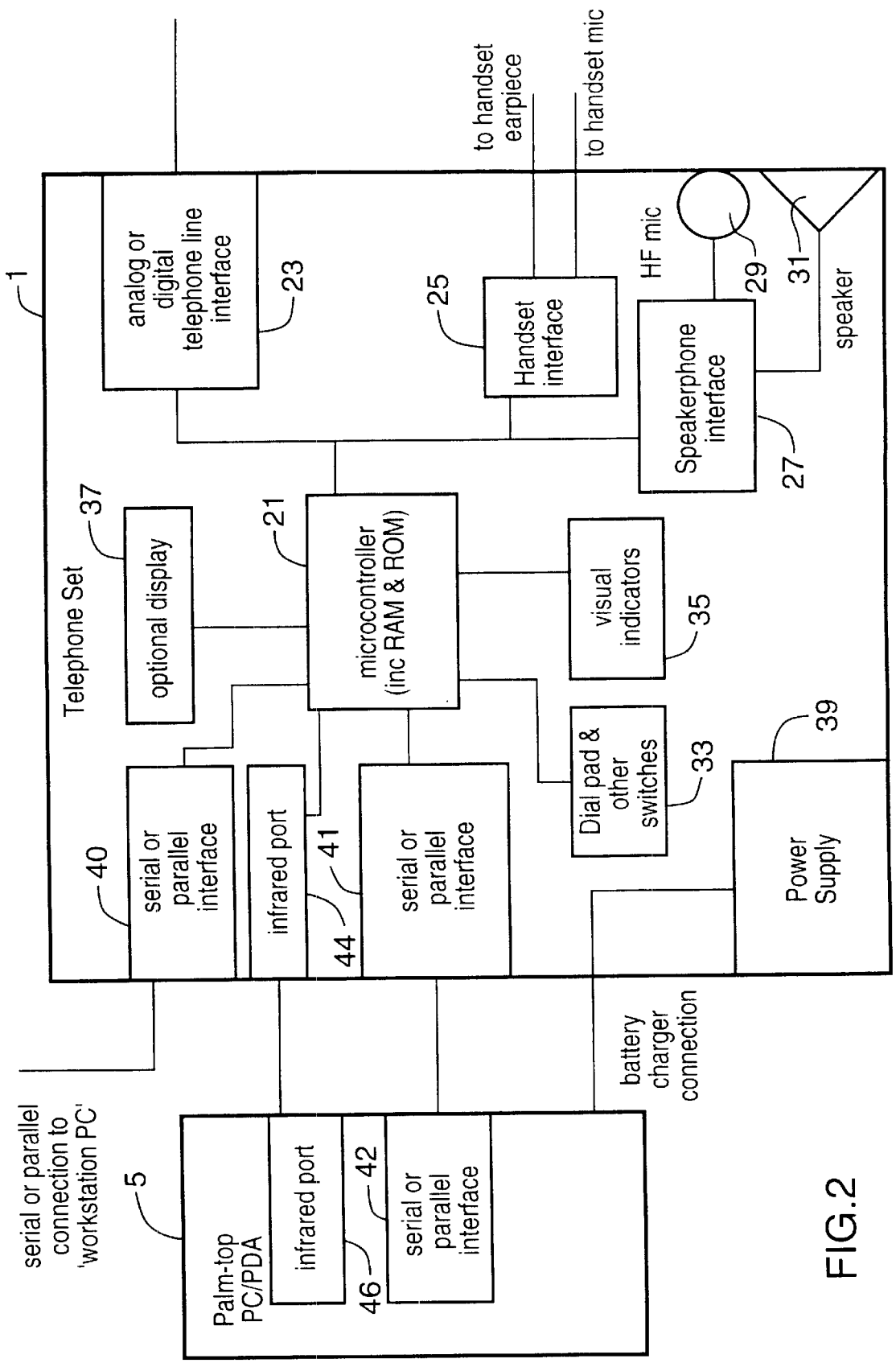
FIG. 2 is a block diagram showing the hardware interface between the telephone, workstation and palm-top PDA of FIG. 1.

Turning to FIG. 2, the hardware components of telephone set 1 are shown in greater detail. In addition to customer components such as microcontroller 21, telephone line interface 23 (for connection to the PSTN), handset interface 25, speakerphone interface 27 (and associated high frequency microphone 29 and speaker 31), dial pad and other keys/switches 33, visual indicators 35 (e.g. LCDs, LEDs), display 37 and power supply 39, a pair of serial or parallel ports 40 and 41 are also provided. The interface 40 connects the telephone set 1 to the workstation or PC 1 as discussed, for example, in applicant's above discussed Personal Assistant®. This connection permits data to be communicated bi-directionally between the palm-top PC 5 and workstation 3, via the telephone set 1, for synchronization of data between the palm-top PC and workstation. This synchronization process does not form part of the present invention, and is well known in the art. The second serial/parallel interface 41 allows control data to be exchanged between the palm-top PC 5 and the telephone set 1, as described in greater detail below with reference to FIG. 4. A compatible serial or parallel interface 42 is provided within the PDA 5.

Figure 3:
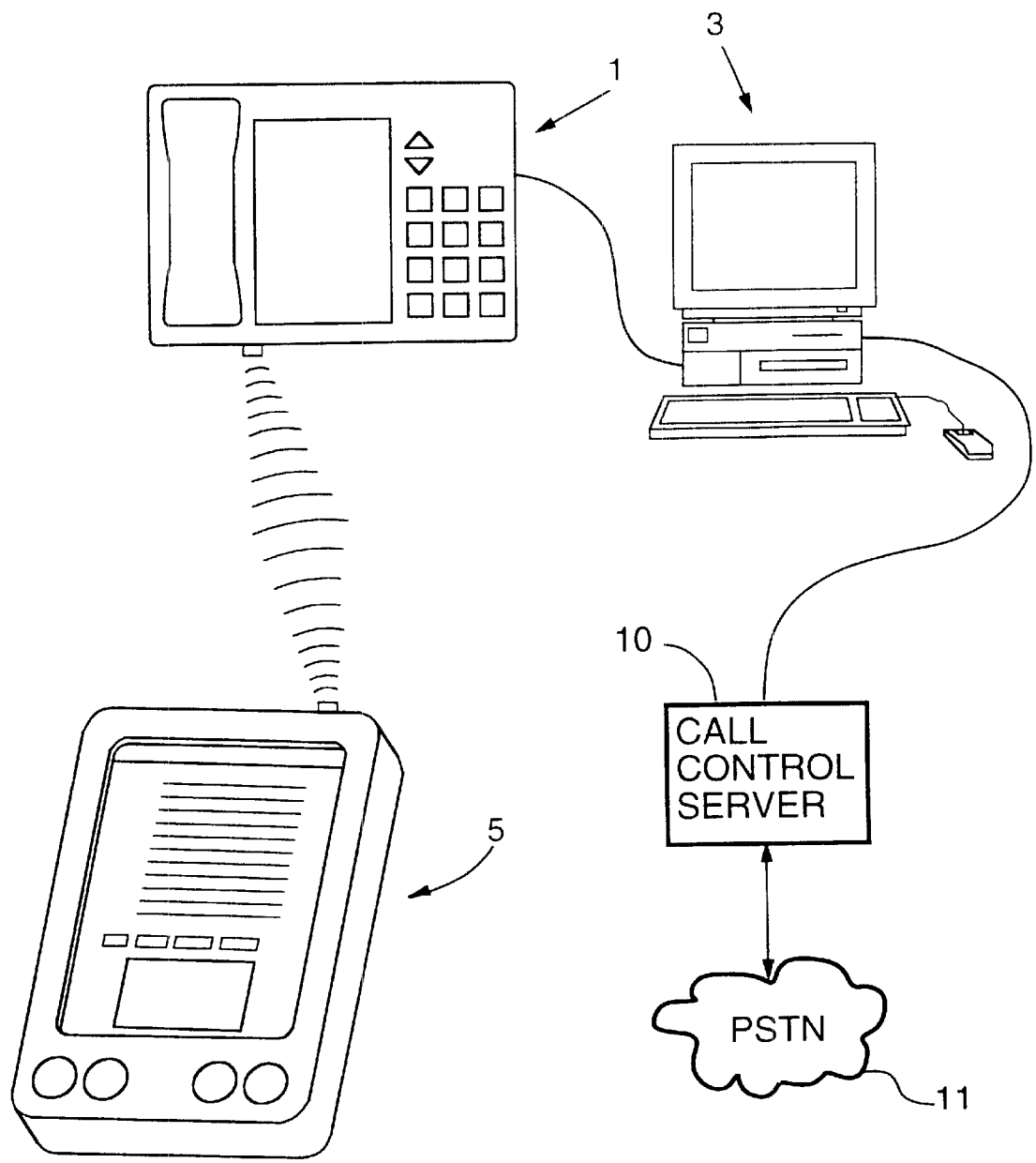
FIG. 3 is a block diagram a palm-top PDA communicating with a telephone set via an infrared port, according to an alternative embodiment of the invention.

With reference to FIG. 3, an embodiment of the invention is shown wherein the palm-top PC 5 and telephone set 1 communicate via an IR link using IR ports 44 and 46 which are similar to those used on existing palm-top PCs to permit information exchange between two palm-top PCs. In all other respects, the hardware configuration is identical to FIG. 1.

Figure 4:
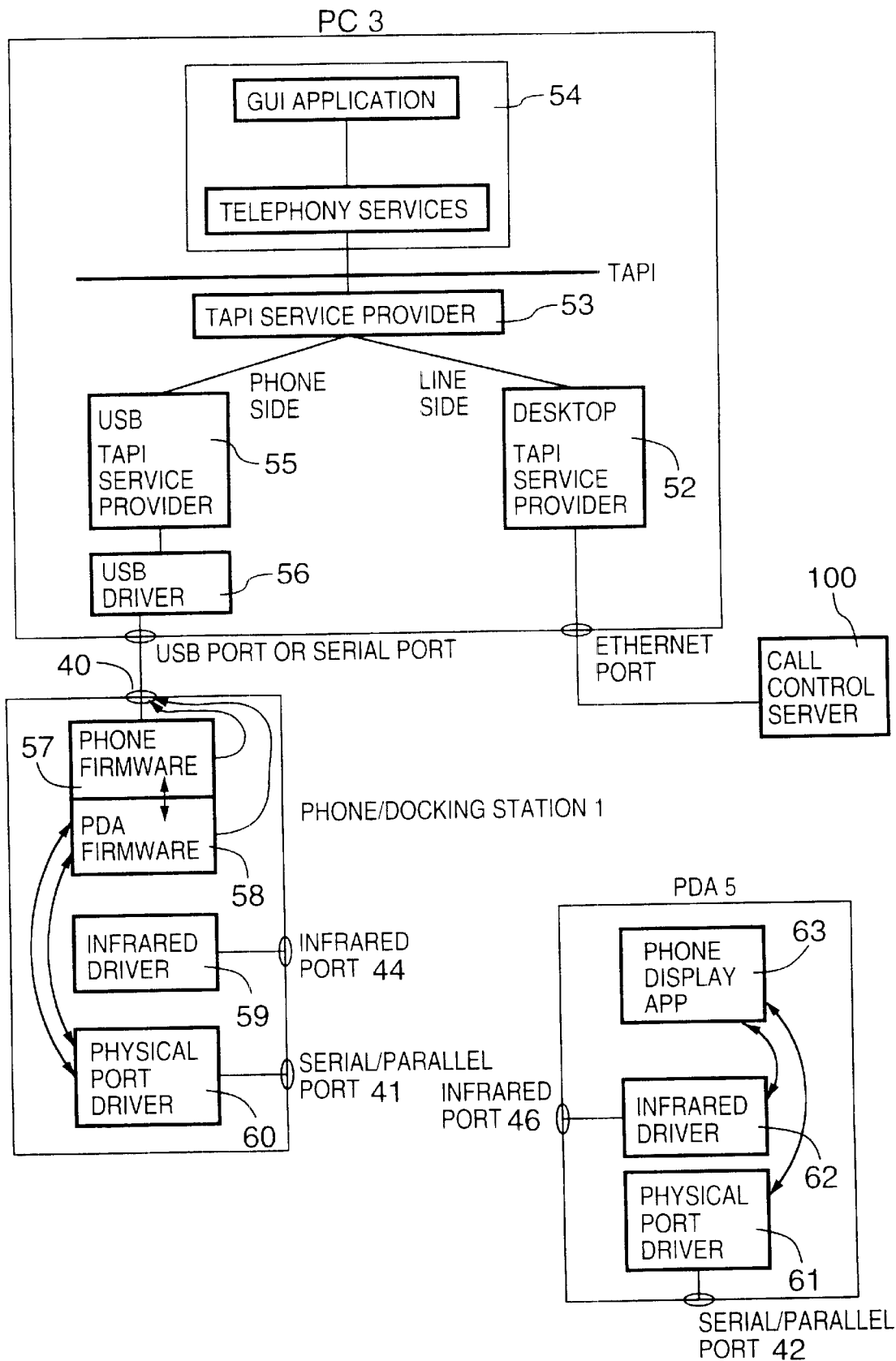
FIG. 4 is a block diagram showing software modules in the palm-top PC, telephone and desktop workstation for effecting bidirectional communication and control therebetween according to both the first and second embodiments.

FIG. 4 shows the software components within the PC 3, telephone I and PDA 5 necessary to carry out the functionality of the present invention. The configuration and operation of the interface between PC 3 and Ethernet call control server 10 is well known in the art. Within the PC 3, a desktop TAPI service provider 52 controls the line side of the well known TAPI interface, whereas a USB TAPI service provider 55 controls the device side of the TAPI communications. Both TAPI service providers 52 and 55 communicate with a TAPI service provider 53 which provides an interface to telephony services and GUI application 54 for implementing display and phone services within the PC 3. The USB TAPI service provider 55 communicates with a USB driver 56, which handles the interface to port 40 on the telephone set 1. Within the telephone set 1, telephone firmware 57 is provided for controlling the dial pad 33, visual indicators 35 and display 37, as well as the interfaces 23, 25 and 27. PDA firmware 58 is also provided for controlling communications with the PDA 5, via one of either an infrared driver 59 or physical port driver 60, when the PDA 5 is docked within the set 1. Within the PDA 5, a phone display application 63 is provided which communicates with the set 1 via one of either physical port driver 61 or infrared driver 62 to implement telephony features. The phone display application 63 supports dialing, call answer, call display, etc., and communicates with the drivers 61 and 62 though the well known WinNET, WinSock, TCP/IP or IrDA, and PPP/SLIP or IrDA Miniports layers of the Windows® CE 2.1 operating system.

In operation, the PDA 5 functions as an extension of the telephony interface provided by telephone set 1. For example, in the event of an incoming call to the set 1 from the call control server 100, the call may answered at the telephone set 1 in the usual manner (by going off hook or actuating a speakerphone key), or if the PDA 5 is connected thereto the call may be answered by actuating a soft key on the PDA 5. More particularly, upon receipt of a call notification from call control server 100 via desktop TAPI service provider 52 and TAPI service provider 53, the telephony services and GUI application 54 send a call notification message to the telephone set 1 via port 40, in a well known manner. The phone firmware 57 then causes the set 1 to ring, and sends a further message to the PDA 5 (via firmware 58 and one of the port pairs 44, 46 or 41,42) which causes the phone display application 63 within PDA 5 to display a call answer soft key (and optionally call display, caller information from a local database, etc.). The user can then answer the call by actuating the soft key on PDA 5. The actuation of the soft key on PDA 5 is interpreted by the socket layer interface provided by phone firmware 57, and thereafter by the socket layer interface in USB driver 56 (the PC 3 has access to the TCP/IP stack, in the usual manner). The user commands are then communicated to the call control server 100 via Ethernet connectivity, in the usual manner, for further call processing. In this way, PDA 5 acts as a display and control extension to the set 1 for controlling calls via call control server 100, regardless of whether the PDA is docked within the set 1 or communicating therewith via IR ports 44 and 46.

A person understanding the present invention may conceive of other embodiments or variations therein, all of which are believed to be within the sphere and scope of the invention as set forth in the claims appended hereto.

What is claimed is:

1. A palm PC dockable phone, comprising:

a personal computer running a software application for implementing telephony functions;

a personal digital assistant (PDA) device providing a user display and input interface; and a telephone set connected to said personal computer and in communication with said PDA device, said telephone set incorporating phone firmware for communicating with said software application and PDA firmware for communicating with said PDA device for controlling said telephony functions via said user display and input interface.

2. The palm PC dockable phone of claim 1, wherein said telephone set includes a cradle for receiving and connecting to said PDA device.

3. The palm PC dockable phone of claim 1, wherein each of said telephone set and said PDA device includes an infrared port for facilitating infrared communication therebetween.

4. The palm PC dockable phone of claim 1, wherein said telephony functions are implemented locally.

5. The palm PC dockable phone of claim 1, wherein said telephony functions are implemented via a call control server.

6. The palm PC dockable phone of claim 1, wherein said phone firmware in said telephone set communicates with said software application in said personal computer over a TAPI interface.

7. The palm PC dockable phone of claim 6, wherein said TAPI interface is implemented at a device level via USB.

* * * * *